United States Patent
Olorenshaw et al.

(10) Patent No.: US 7,272,562 B2
(45) Date of Patent: Sep. 18, 2007

(54) SYSTEM AND METHOD FOR UTILIZING SPEECH RECOGNITION TO EFFICIENTLY PERFORM DATA INDEXING PROCEDURES

(75) Inventors: Lex Olorenshaw, Half Moon Bay, CA (US); Gustavo Hernandez Abrego, San Jose, CA (US); Eugene Koontz, Mountain View, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 358 days.

(21) Appl. No.: 10/812,560

(22) Filed: Mar. 30, 2004

(65) Prior Publication Data

US 2005/0228671 A1    Oct. 13, 2005

(51) Int. Cl.
*G10L 11/00* (2006.01)
(52) U.S. Cl. ...................... 704/270; 704/235
(58) Field of Classification Search ................ 704/277, 704/235, 270
See application file for complete search history.

(56) References Cited

U.S. PATENT DOCUMENTS

| | | | |
|---|---|---|---|
| 5,649,060 A | 7/1997 | Ellozy et al. | |
| 6,377,925 B1 * | 4/2002 | Greene et al. | 704/271 |
| 6,499,016 B1 * | 12/2002 | Anderson | 704/275 |
| 6,611,803 B1 * | 8/2003 | Furuyama et al. | 704/254 |
| 2004/0111272 A1 * | 6/2004 | Gao et al. | 704/277 |
| 2005/0081159 A1 * | 4/2005 | Gupta et al. | 715/751 |
| 2005/0137843 A1 * | 6/2005 | Lux | 704/2 |
| 2005/0149336 A1 * | 7/2005 | Cooley | 704/277 |

* cited by examiner

*Primary Examiner*—David Hudspeth
*Assistant Examiner*—Jakieda R. Jackson
(74) *Attorney, Agent, or Firm*—Gregory J. Koerner; Redwood Patent Law

(57) ABSTRACT

A system and method for utilizing speech recognition to efficiently perform data indexing procedures includes an authoring module that coordinates an authoring procedure for creating an index file that has pattern word sets corresponding to data objects stored in a memory of a host electronic device. The pattern word sets are generated with a speech recognition engine that transforms spoken data descriptions into text data descriptions for creating the pattern word sets. The pattern word sets are associated in the index file with data object identifiers that uniquely identify the corresponding data objects. A retrieval module manages a retrieval procedure in which the speech recognition engine converts a spoken data request into a text data request. The retrieval module compares the text data request and the pattern word sets to identify a requested object identifier for locating a requested data object from among the data objects stored in the memory of the host electronic device.

44 Claims, 9 Drawing Sheets

Fig. 4      410

SYSTEM AND METHOD FOR UTILIZING SPEECH RECOGNITION TO EFFICIENTLY PERFORM DATA INDEXING PROCEDURES

BACKGROUND SECTION

1. Field of Invention

This invention relates generally to electronic speech recognition systems, and relates more particularly to a system and method for utilizing speech recognition to efficiently perform data indexing procedures.

2. Description of the Background Art

Implementing robust and effective techniques for system users to interface with electronic devices is a significant consideration of system designers and manufacturers. Voice-controlled operation of electronic devices may often provide a desirable interface for system users to control and interact with electronic devices. For example, voice-controlled operation of an electronic device may allow a user to perform other tasks simultaneously, or can be advantageous in certain types of operating environments. In addition, hands-free operation of electronic devices may also be desirable for users who have physical limitations or other special requirements.

Hands-free operation of electronic devices may be implemented by various speech-activated electronic devices. Speech-activated electronic devices advantageously allow users to interface with electronic devices in situations where it would be inconvenient or potentially hazardous to utilize a traditional input device. However, effectively implementing such speech recognition systems creates substantial challenges for system designers.

For example, enhanced demands for increased system functionality and performance require more system processing power and require additional hardware resources. An increase in processing or hardware requirements typically results in a corresponding detrimental economic impact due to increased production costs and operational inefficiencies.

Furthermore, enhanced system capability to perform various advanced operations provides additional benefits to a system user, but may also place increased demands on the control and management of various system components. Therefore, for at least the foregoing reasons, implementing a robust and effective method for a system user to interface with electronic devices through speech recognition remains a significant consideration of system designers and manufacturers.

SUMMARY

In accordance with the present invention, a system and method are disclosed for utilizing speech recognition to efficiently perform data indexing procedures. In one embodiment, a system user or other appropriate entity initially instructs an authoring module of an electronic device to enter an authoring mode by utilizing any effective techniques. The authoring module responsively displays thumbnail representations of stored images on an indexing graphical user interface (GUI) of the electronic device. The foregoing thumbnail representations each correspond to a different individual image of stored data from a memory of the electronic device.

A system user or other entity may then choose a selected image from the thumbnail images displayed on the indexing GUI for performing the authoring procedure. The selected image may be chosen using any desired techniques to then become the subject image for creating and storing a corresponding set of one or more pattern words into an index file in the memory of the electronic device. The system user or other entity may then provide a spoken image description corresponding to the foregoing selected image by utilizing any appropriate techniques. For example, the system user may speak the spoken image description into a sound sensor of the electronic device.

A speech recognition engine of the electronic device performs a speech recognition procedure upon a spoken image description to generate a corresponding text image description that the authoring module displays upon an editing section of the indexing GUI. The system user or other entity may then utilize the indexing GUI to edit the displayed text image description to thereby selectively produce one or more pattern words for a corresponding pattern word set. The authoring module then stores the foregoing pattern word set along with an image identifier corresponding to the selected image into the index file. The authoring procedure may be repeated any desired number of times in order to generate additional sets of pattern words to fully populate the index file for subsequently performing one or more image retrieval procedures.

In certain embodiments, a system user or other appropriate entity may utilize a retrieval module of the electronic device to enter an image retrieval mode by utilizing any effective techniques. Next, the system user or other entity provides a spoken image request corresponding to a previously-captured image by utilizing any appropriate techniques. For example, the system user may speak the spoken image request into the sound sensor of the electronic device. The foregoing spoken image request may include any desired verbal description relating to a requested image from the stored images in the memory of the host electronic device.

The speech recognition engine then performs a speech recognition procedure upon the spoken image request to thereby efficiently generate a corresponding text image request. The retrieval module then automatically performs a search procedure upon the foregoing index file that was previously created with the authoring procedure discussed above. The retrieval module may perform the foregoing search procedure by utilizing any effective techniques. For example, in certain embodiments, the retrieval module examines the index file for one or more search matches between the pattern words and the foregoing text image request generated by the speech recognition engine.

If the foregoing search procedure locates one or more matching pattern words in the index file, then the retrieval module utilizes a corresponding image identifier to efficiently locate and display the appropriate image upon a display of the electronic device. The retrieval procedure may be repeated to retrieve and display any desired number of images from the stored data in the electronic device. The present invention therefore provides an improved system and method for efficiently utilizing speech recognition to perform data indexing procedures.

DETAILED DESCRIPTION

The present invention relates to an improvement in speech recognition systems. The following description is presented to enable one of ordinary skill in the art to make and use the invention, and is provided in the context of a patent application and its requirements. Various modifications to the embodiments disclosed herein will be apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for utilizing speech recognition to efficiently perform data indexing procedures including an authoring module that coordinates an authoring procedure for creating an index file that has pattern word sets corresponding to data objects stored in a memory of a host electronic device. The pattern word sets are generated by utilizing a speech recognition engine that transforms spoken data descriptions into text data descriptions for creating the pattern word sets. The pattern word sets are associated in the index file with data object identifiers that uniquely identify the corresponding data objects. A retrieval module then manages a retrieval procedure in which the speech recognition engine automatically converts a spoken data request into a text data request. The retrieval module compares the text data request and the pattern word sets to identify a requested object identifier for locating a requested data object from among the data objects stored in the memory of the host electronic device.

Figure 1:
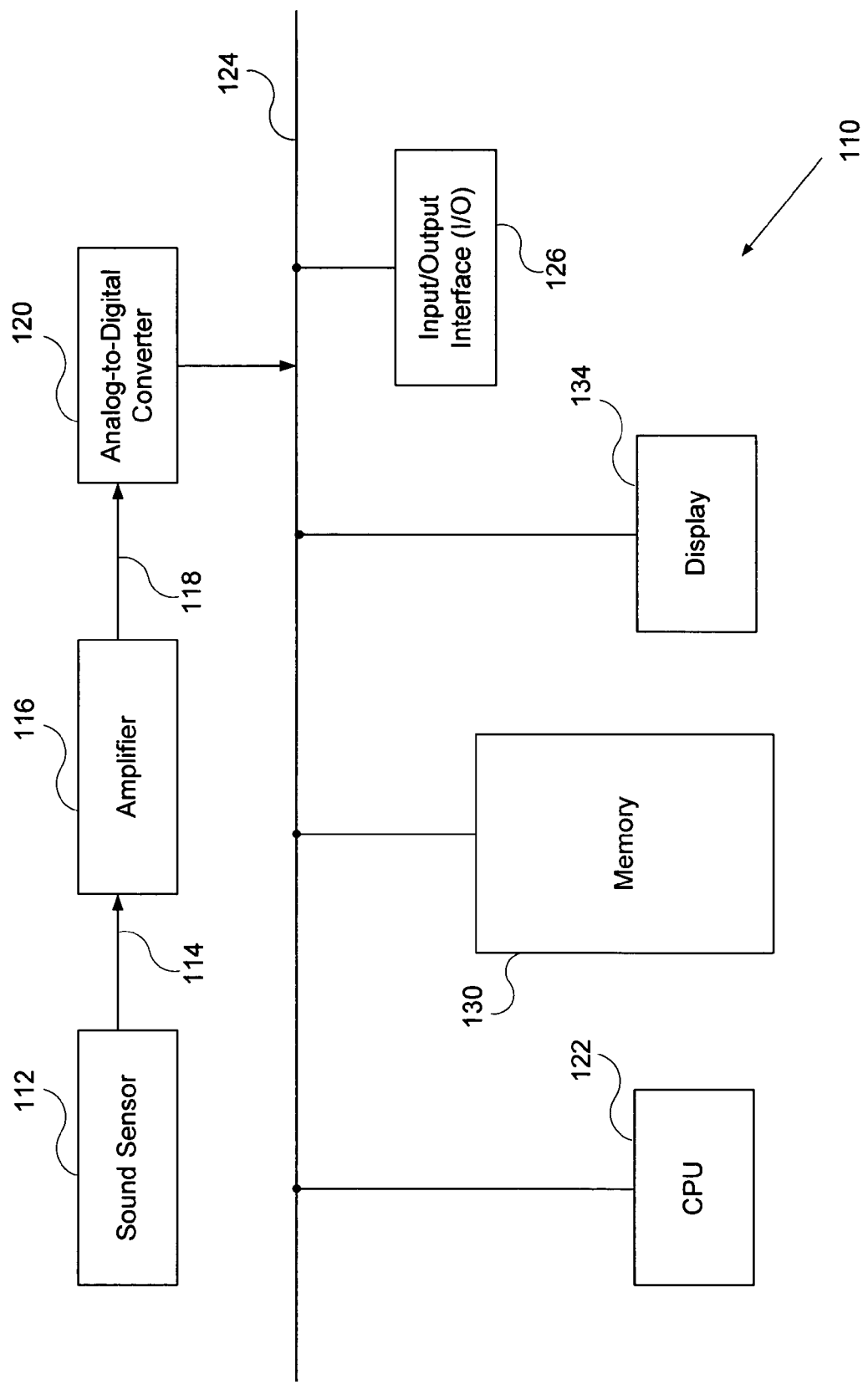
FIG. 1 is a block diagram for one embodiment of an electronic device, in accordance with the present invention.

Referring now to FIG. 1, a block diagram for one embodiment of an electronic device 110 is shown, according to the present invention. The FIG. 1 embodiment includes, but is not limited to, a sound sensor 112, an amplifier 116, an analog-to-digital converter 120, a central processing unit (CPU) 122, a device bus 124, an input/output interface (I/O) 126, a memory 130, and a display 134. In alternate embodiments, electronic device 110 may include elements or functionalities in addition to, or instead of, certain of the elements or functionalities discussed in conjunction with the FIG. 1 embodiment.

In the FIG. 1 embodiment, sound sensor 112 detects sound energy from spoken speech, and then converts the detected sound energy into an analog speech signal that is provided via path 114 to amplifier 116. Amplifier 116 amplifies the received analog speech signal, and provides the amplified analog speech signal to analog-to-digital converter 120 via path 118. Analog-to-digital converter 120 converts the amplified analog speech signal into corresponding digital speech data, and then provides the digital speech data to device bus 124.

CPU 122 then accesses the digital speech data on device bus 124, and responsively analyzes and processes the digital speech data to perform speech recognition procedures according to software instructions contained in memory 130. The operation of CPU 122 and the software instructions in memory 130 are further discussed below in conjunction with FIGS. 2-9. After the speech data has been processed, CPU 122 may then provide the results of the speech recognition procedures to other devices (not shown) via input/output interface 126.

In certain embodiments, electronic device 110 may be implemented as a computer device. In alternate embodiments, the present invention may also be embodied in various other types of electronic devices and systems. For example, the present invention may be implemented as part of an electronic imaging device, a digital still camera device, a cellular telephone, or a personal digital assistant device. In addition, the present invention may be implemented as part of entertainment robots such as AIBO™ and QRIO™ by Sony Corporation.

Figure 2:
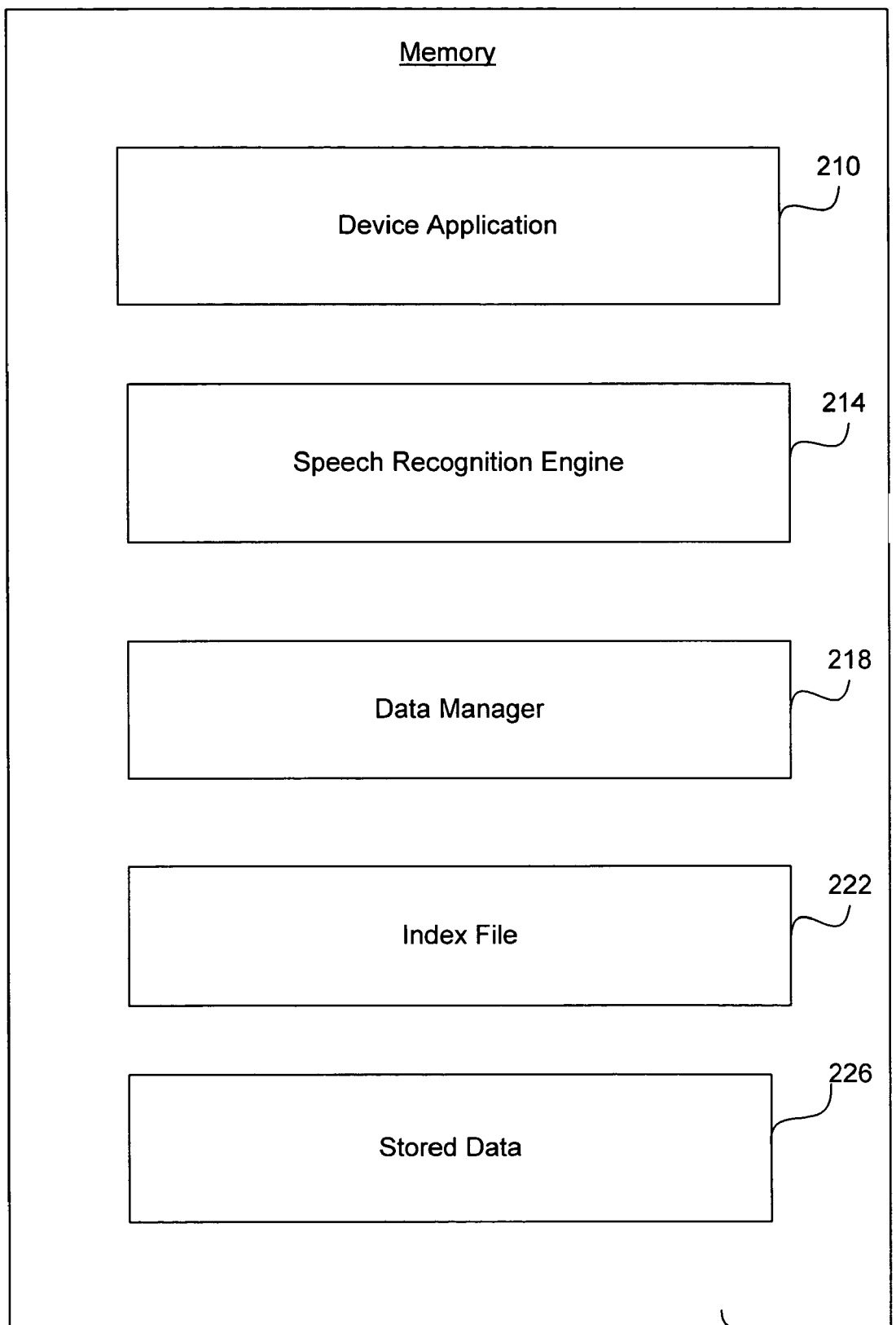
FIG. 2 is a block diagram for one embodiment of the memory of FIG. 1, in accordance with the present invention.

Referring now to FIG. 2, a block diagram for one embodiment of the FIG. 1 memory 130 is shown, according to the present invention. Memory 130 may comprise any desired storage-device configurations, including, but not limited to, random access memory (RAM), read-only memory (ROM), and storage devices such as floppy discs or hard disc drives. In the FIG. 2 embodiment, memory 130 includes a device application 210, speech recognition engine 214, a data manager 218, an index file 222, and stored data 226. In alternate embodiments, memory 130 may include elements and functionalities in addition to, or instead of, certain of the elements and functionalities discussed in conjunction with the FIG. 2 embodiment.

In the FIG. 2 embodiment, device application 210 includes program instructions that are executed by CPU 122 (FIG. 1) to perform various functions and operations for electronic device 110. The particular nature and functionality of device application 210 typically varies depending upon factors such as the type and particular use of the corresponding electronic device 110.

In the FIG. 2 embodiment, speech recognition engine 214 includes one or more software modules that are executed by CPU 122 to analyze and recognize input sound data. Certain embodiments of speech recognition engine 214 are further discussed below in conjunction with FIGS. 3-4. In the FIG. 2 embodiment, data manager 218 includes one or more software modules and other information for performing various data indexing procedures by utilizing index file 222 and speech recognition engine 214 in accordance with the present invention.

Stored data 226 includes, but is not limited to, various types of image data like individual digital photographs or images captured with a digital still camera or other appropriate means. In various embodiments, the present invention may also be effectively utilized in conjunction with various types of data objects in addition to, or instead of, the foregoing image data. The utilization and functionality of data manager 218 and index file 222 are further discussed below in conjunction with FIGS. 8-9.

Figure 3:
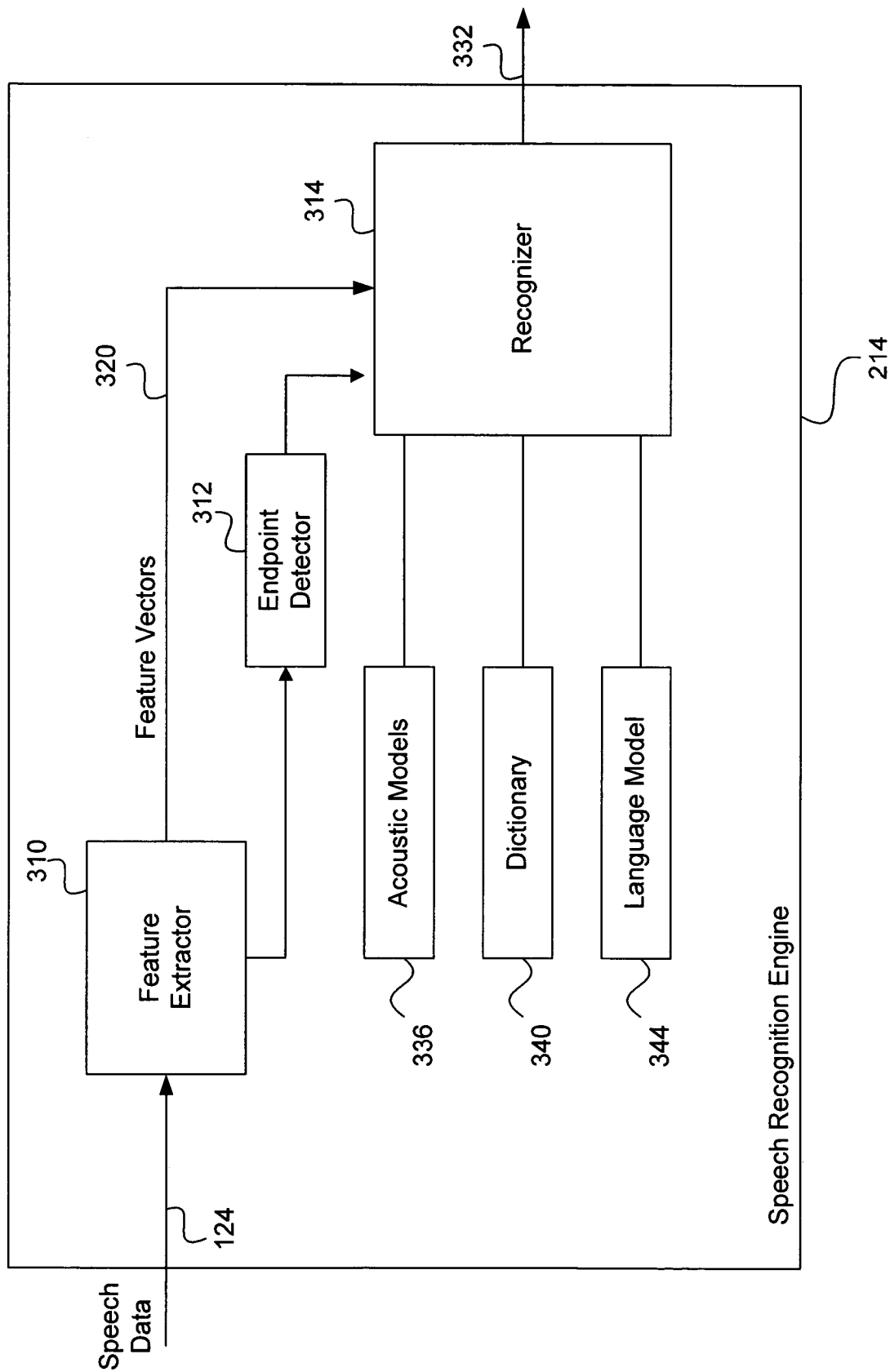
FIG. 3 is a block diagram for one embodiment of the speech recognition engine of FIG. 2, in accordance with the present invention.

Referring now to FIG. 3, a block diagram for one embodiment of the FIG. 2 speech recognition engine 214 is shown, in accordance with the present invention. Speech recognition engine 214 includes, but is not limited to, a feature extractor 310, an endpoint detector 312, a recognizer 314, acoustic models 336, dictionary 340, and language model 344. In alternate embodiments, speech recognition engine 214 may include elements and functionalities in addition to, or instead of, certain of the elements and functionalities discussed in conjunction with the FIG. 3 embodiment.

In the FIG. 3 embodiment, a sound sensor 112 (FIG. 1) provides digital speech data to feature extractor 310 via system bus 124. Feature extractor 310 responsively generates corresponding representative feature vectors, that are provided to recognizer 314 via path 320. Feature extractor 310 also provides the speech data to endpoint detector 312 which responsively identifies endpoints of utterances represented by the speech data to indicate the beginning and end of an utterance in time. Endpoint detector 312 then provides the foregoing endpoints to recognizer 314.

In the FIG. 3 embodiment, recognizer 314 is configured to recognize words in a vocabulary which is represented in dictionary 340. The foregoing vocabulary in dictionary 340 corresponds to any desired utterances, instructions, narration, or other sounds that are supported for speech recognition by speech recognition engine 214.

In practice, each word from dictionary 340 is associated with a corresponding phone string (string of individual phones) that represents the pronunciation of that word. Acoustic models 336 (such as Hidden Markov Models) for each of the phones are selected and combined to create the foregoing phone strings for accurately representing pronunciations of words in dictionary 340. Recognizer 314 compares input feature vectors from line 320 with the entries (phone strings) from dictionary 340 to determine which word produces the highest recognition score. The word corresponding to the highest recognition score may thus be identified as the recognized word.

Speech recognition engine 214 also utilizes language model 344 to determine specific recognized word sequences that are supported by speech recognition engine 214. Recognized sequences of vocabulary words may then be output as the foregoing word sequences from recognizer 314 via path 332. The operation and implementation of recognizer 314, dictionary 340, and language model 344 are further discussed below in conjunction with FIG. 4.

Figure 4:
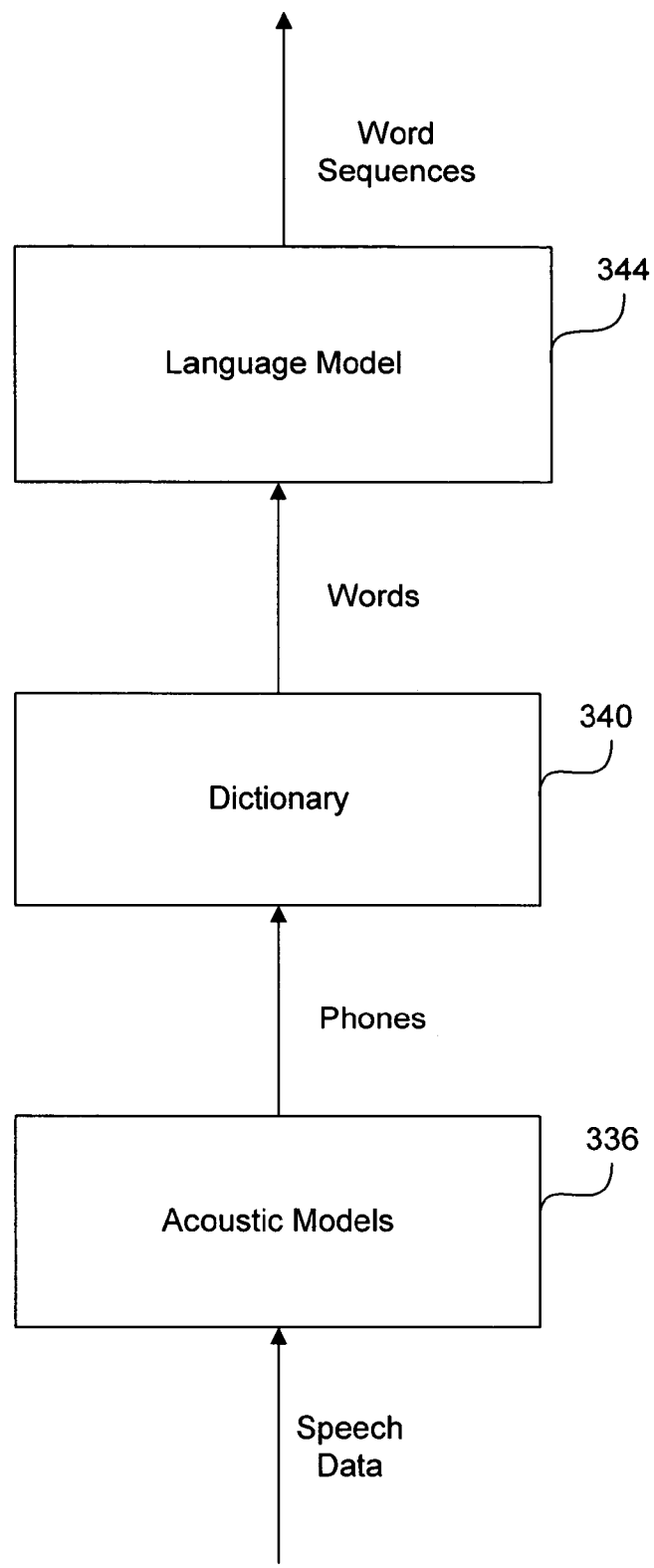
FIG. 4 is a block diagram illustrating functionality of the speech recognition engine of FIG. 3, in accordance with one embodiment of the present invention.

Referring now to FIG. 4, a block diagram illustrating functionality of the FIG. 3 speech recognition engine 214 is shown, in accordance with one embodiment of the present invention. In alternate embodiments, the present invention may perform speech recognition procedures using techniques and functionalities in addition to, or instead of, certain of the techniques and functionalities discussed in conjunction with the FIG. 4 embodiment.

In the FIG. 4 embodiment, speech recognition engine 214 (FIG. 3) initially receives speech data from a sound sensor 112. A recognizer 314 (FIG. 3) from speech recognition engine 214 compares the input speech data with acoustic models 336 to identify a series of phones (phone strings) that represent the input speech data. Recognizer 314 references dictionary 340 to look up recognized vocabulary words that correspond to the identified phone strings. The recognizer 314 utilizes language model 344 to form the recognized vocabulary words into word sequences, such as sentences or phrases, that are supported by speech recognition engine 214.

In certain embodiments, the foregoing word sequences are advantageously utilized to author an index file 222 (FIG. 2) of pattern words and corresponding image identifiers for locating specific images in stored data 226 (FIG. 2), in accordance with the present invention. The utilization of speech recognition engine 214 to create and utilize index file 222 is further discussed below in conjunction with FIGS. 8-9.

Figure 5:
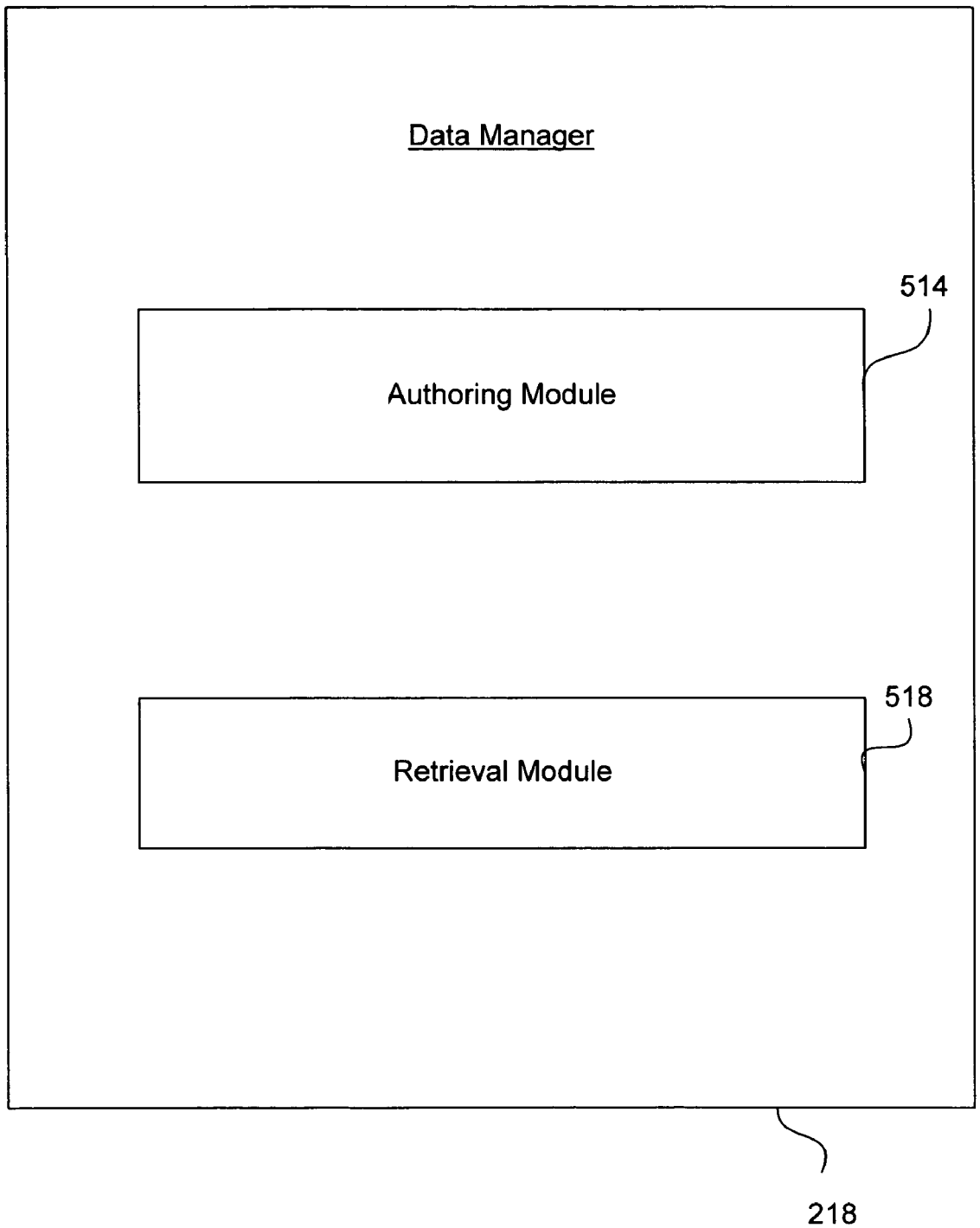
FIG. 5 is a block diagram for one embodiment of the data manager of FIG. 2, in accordance with the present invention.

Referring now to FIG. 5, a block diagram of the FIG. 2 data manager 218 is shown, in accordance with one embodiment of the present invention. In the FIG. 5 embodiment, data manager 218 includes an authoring module 514 and a retrieval module 518. In alternate embodiments, data manager 218 may include components or functionalities in addition to, or instead of, certain of the components and functionalities discussed in conjunction with the FIG. 5 embodiment.

In the FIG. 5 embodiment, electronic device 110 utilizes authoring module 514 for performing an authoring procedure to create an index file 222 (FIG. 2). In the FIG. 5 embodiment, electronic device 110 may then utilize retrieval module 518 and the foregoing index file 222 to perform a retrieval procedure to efficiently and effectively locate and display one or more selected images from stored data 226 (FIG. 2) upon display 134 of electronic device 110. The utilization of authoring module 514 is discussed below in conjunction with FIG. 8, and the utilization of retrieval module 518 is discussed below in conjunction with FIG. 9.

Figure 6:
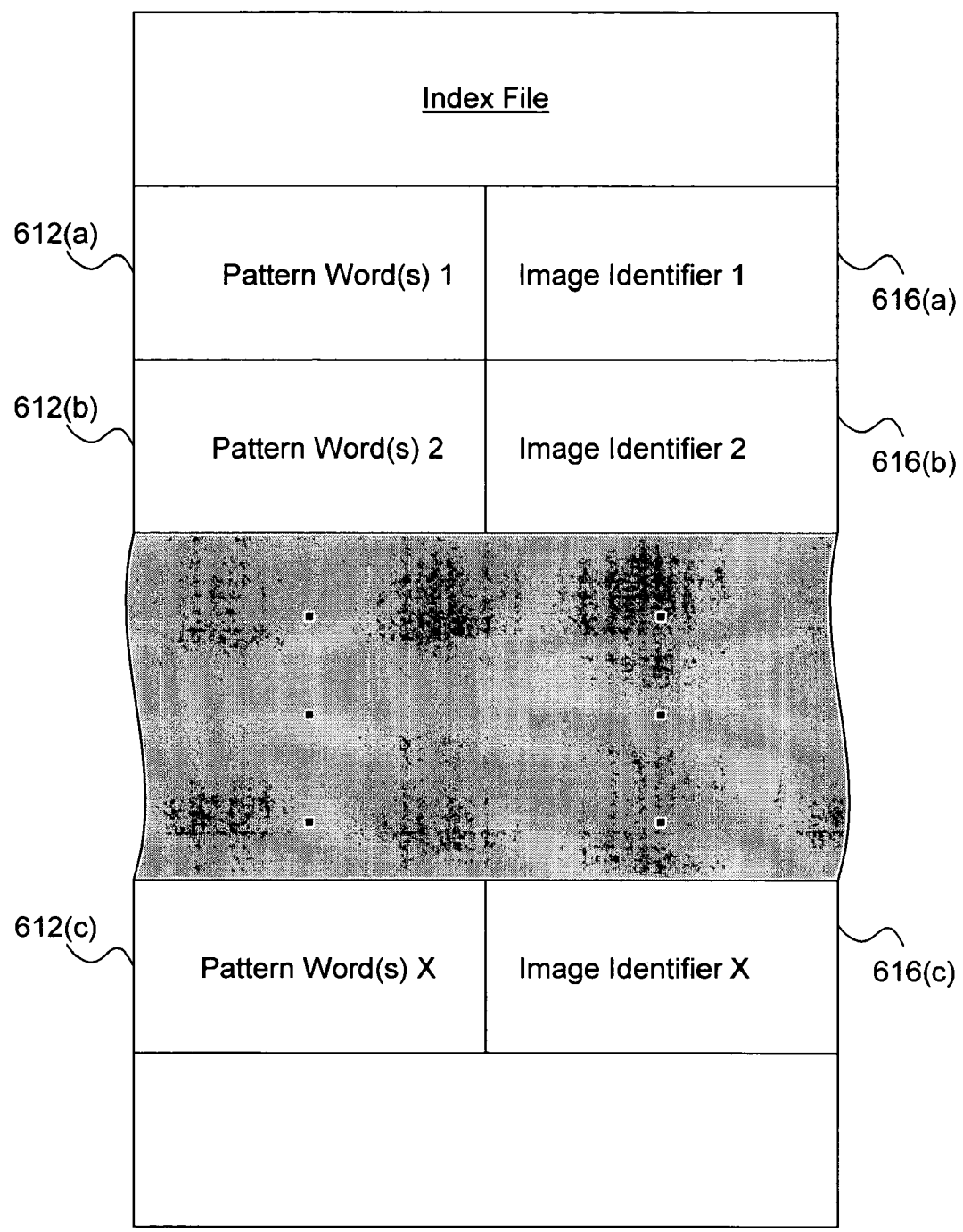
FIG. 6 is a block diagram for one embodiment of the index file of FIG. 2, in accordance with the present invention.

Referring now to FIG. 6, a block diagram for one embodiment of the FIG. 2 index file 222 is shown, in accordance with the present invention. In alternate embodiments, index file 222 may include elements and functionalities in addition to, or instead of, certain of the elements and functionalities discussed in conjunction with the FIG. 6 embodiment.

In the FIG. 6 embodiment, index file 222 includes pattern word(s) 1 (612(a)) through pattern word(s) X (612(c)). Index file 222 may be implemented to include any number of different sets of pattern words 612 that may include any desired type of information. In the FIG. 6 embodiment, each set of pattern words 612 from index file 222 typically includes one or more search terms, words, or phrases corresponding to a particular image from stored data 226 (FIG. 2). For example, if the particular image was a photograph of a dog running on a beach, the corresponding set of pattern words 612 might include the words "running dog" and "beach". Each set of pattern words 612 may include one or more relationship indicators regarding various types of relationships between individual words from the corresponding set as used by retrieval module 518. In addition, each set of pattern words 612 may include one or more priority indicators regarding various types of priorities for words from the corresponding set as used by retrieval module 518.

In the FIG. 6 embodiment, each set of pattern words 612 is associated with a corresponding image identifier 616 that uniquely identifies a particular image in stored data 226 (FIG. 2). For example, pattern word(s) 1 (612(a)) corresponds to image identifier 1 (616(a)), pattern word(s) 2 (612(b)) corresponds to image identifier 2 (616(b)), and pattern word(s) X (612(c)) corresponds to image identifier X (516(c)). In certain alternate embodiments, pattern words 612 may also be associated with corresponding object identifiers that each uniquely correspond to a different data object.

In the FIG. 6 embodiment, an authoring module 514 (FIG. 5) coordinates an authoring procedure that utilizes speech recognition engine 214 (FIG. 2) to efficiently create pattern words 612 for index file 222. Once index file 222 has been created, then a retrieval module 518 (FIG. 5) may coordinate a retrieval procedure that utilizes speech recognition engine 214 and index file 222 to locate selected images from stored data 226 for viewing on display 134 of electronic device 110

(FIG. 1). The foregoing authoring procedure is further discussed below in conjunction with FIG. 8, and the foregoing retrieval procedure is further discussed below in conjunction with FIG. 9.

Figure 7:
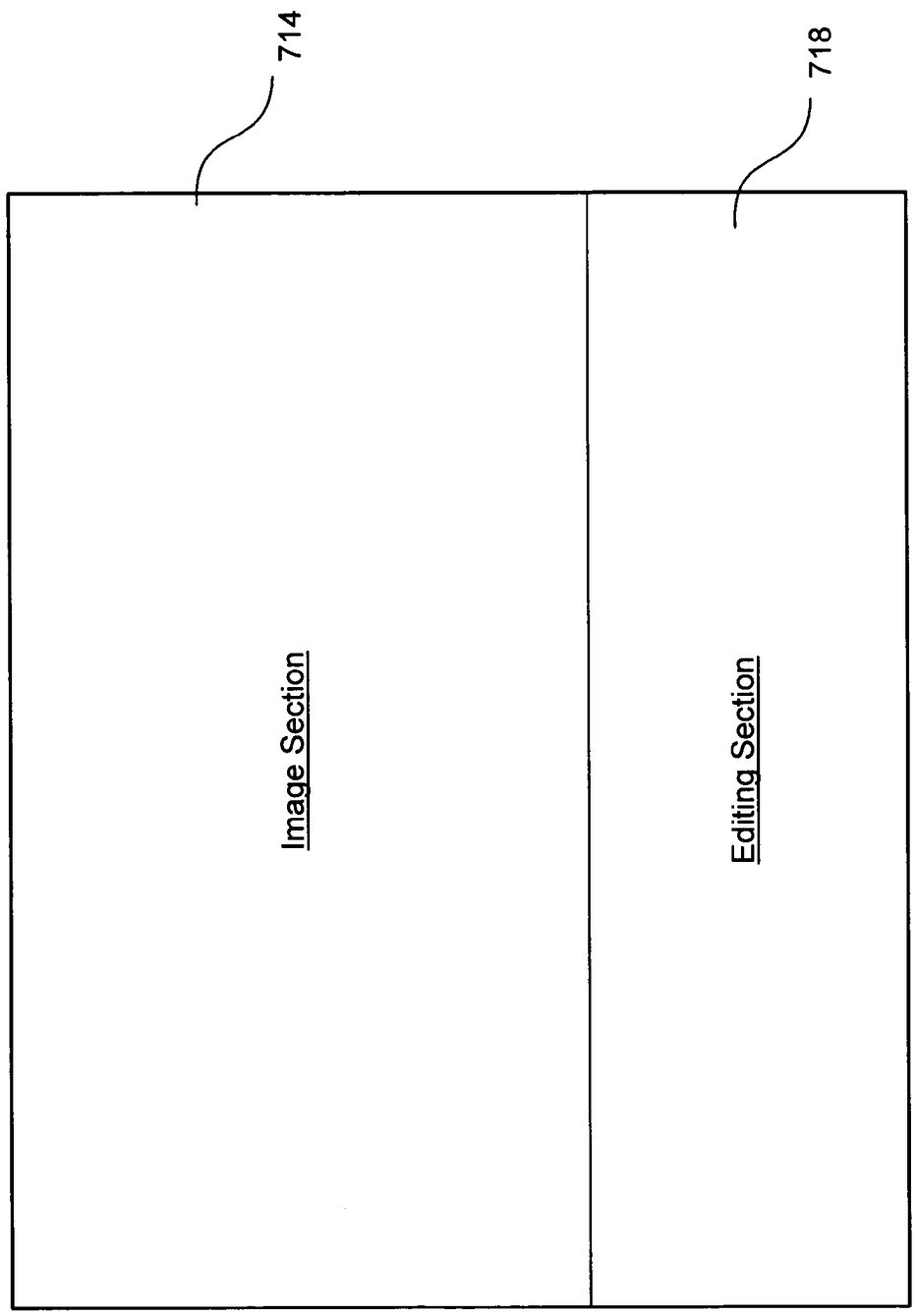
FIG. 7 is a block diagram of an indexing graphical user interface (GUI), in accordance with one embodiment of the present invention.

Referring now to FIG. 7, a block diagram for one embodiment of an indexing graphical user interface (GUI) 710 is shown, in accordance with the present invention. In the FIG. 7 embodiment, indexing GUI 710 may include, but is not limited to, an image section 714 and an editing section 718. In alternate embodiments, indexing GUI 710 may include elements and functionalities in addition to, or instead of, certain of the elements and functionalities discussed in conjunction with the FIG. 7 embodiment.

In the FIG. 7 embodiment, authoring module 514 (FIG. 5) advantageously generates indexing GUI 710 for a system user to interactively participate in an authoring procedure for populating index file 222 with pattern words 612 and corresponding image identifiers 616. In the FIG. 7 embodiment, image section 714 may include, but is not limited to, representations of one or more individual images from stored data 226. For example, image section 714 may display any desired number of thumbnail representations (having a relatively small size and a reduced resolution) for images from stored data 226. A system user may then utilize any appropriate means for choosing a selected image displayed on image section 714.

In the FIG. 7 embodiment, indexing GUI 710 also includes editing section 718 for displaying an image description provided by the system user or other appropriate entity. In accordance with certain embodiments of the present invention, speech recognition engine 214 converts a spoken image description provided by the system user into a test image description for display upon editing section 718 of indexing GUI 710. The system user or other appropriate entity may then selectively edit the foregoing text image description on editing section 718 to produce a corresponding set of pattern words 612 for index file 222. The utilization of indexing GUI 710 is further discussed below in conjunction with FIG. 8.

Figure 8:
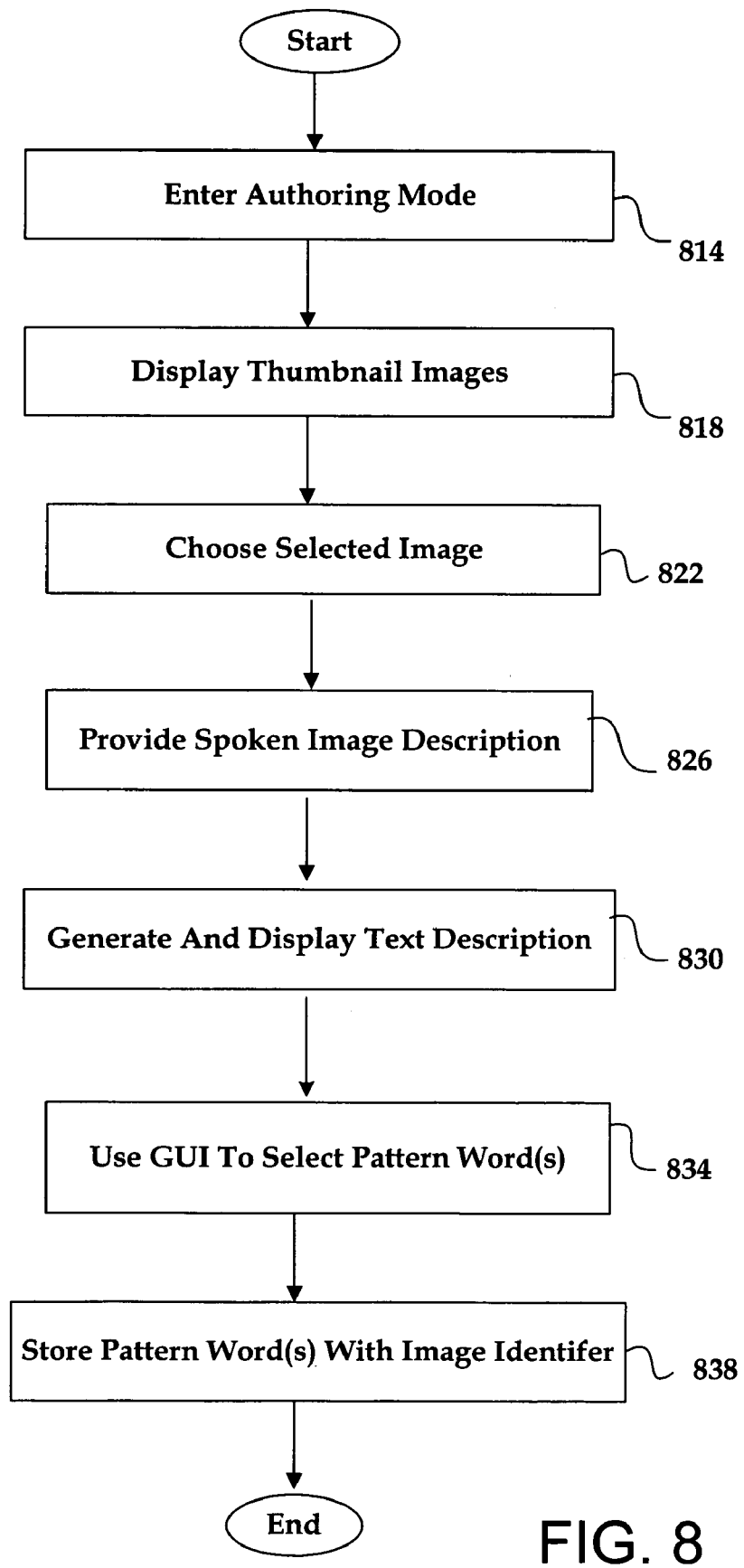
FIG. 8 is a flowchart of method steps for performing an authoring procedure, in accordance with one embodiment of the present invention.

Referring now to FIG. 8, a flowchart of method steps for performing an authoring procedure is shown, in accordance with one embodiment of the present invention. The FIG. 8 flowchart is presented for purposes of illustration, and in alternate embodiments, the present invention may utilize steps and sequences in addition to, or instead of, certain of the steps and sequences discussed in conjunction with the FIG. 8 embodiment.

In the FIG. 8 embodiment, in step 814, a system user or other appropriate entity initially instructs an authoring module 514 of electronic device 110 to enter an authoring mode by utilizing any effective techniques. For example, the system user may use a verbal authoring-mode command that is recognized by a speech recognition engine 214 of electronic device 110 to enter the foregoing authoring mode. In step 818, authoring module 514 responsively displays thumbnail images on an indexing GUI 710 of electronic device 110. The thumbnail images each correspond to a different individual image from stored data 226 in memory 130 of electronic device 110.

In step 822, a system user or other entity chooses a selected image from the foregoing thumbnail images displayed on indexing GUI 710. The selected image may be chosen using any desired techniques to then become the subject image for creating and storing a corresponding set of pattern words 612 into an index file 222 in memory 130 of electronic device 110. In step 826, the system user or other entity provides a spoken image description corresponding to the foregoing selected image by utilizing any appropriate techniques. For example, the system user may speak the spoken image description into sound sensor 112 (FIG. 1) of electronic device 110.

In step 830, speech recognition engine 214 performs a speech recognition procedure upon the spoken image description to generate a corresponding text image description that authoring module 514 then displays upon an editing section of the indexing GUI 710 of electronic device 110. In step 834, the system user or other entity utilizes indexing GUI 710 to edit the displayed text image description to thereby selectively produce one or more pattern word(s) 612. In the FIG. 8 embodiment, the displayed text image description may be edited by deleting, adding, or changing words to produce the corresponding pattern word(s) 612.

Finally, in step 838, authoring module 514 stores the foregoing pattern word(s) 612 along with an image identifier 616 uniquely corresponding to the selected image into index file 222. The FIG. 8 process may then terminate. In certain embodiments, the foregoing FIG. 8 authoring procedure may readily be repeated any desired number of times in order to generate addition sets of pattern words 612 to fully populate index file 222 for subsequently performing one or more image retrieval procedures, as discussed below in conjunction with FIG. 9.

Figure 9:
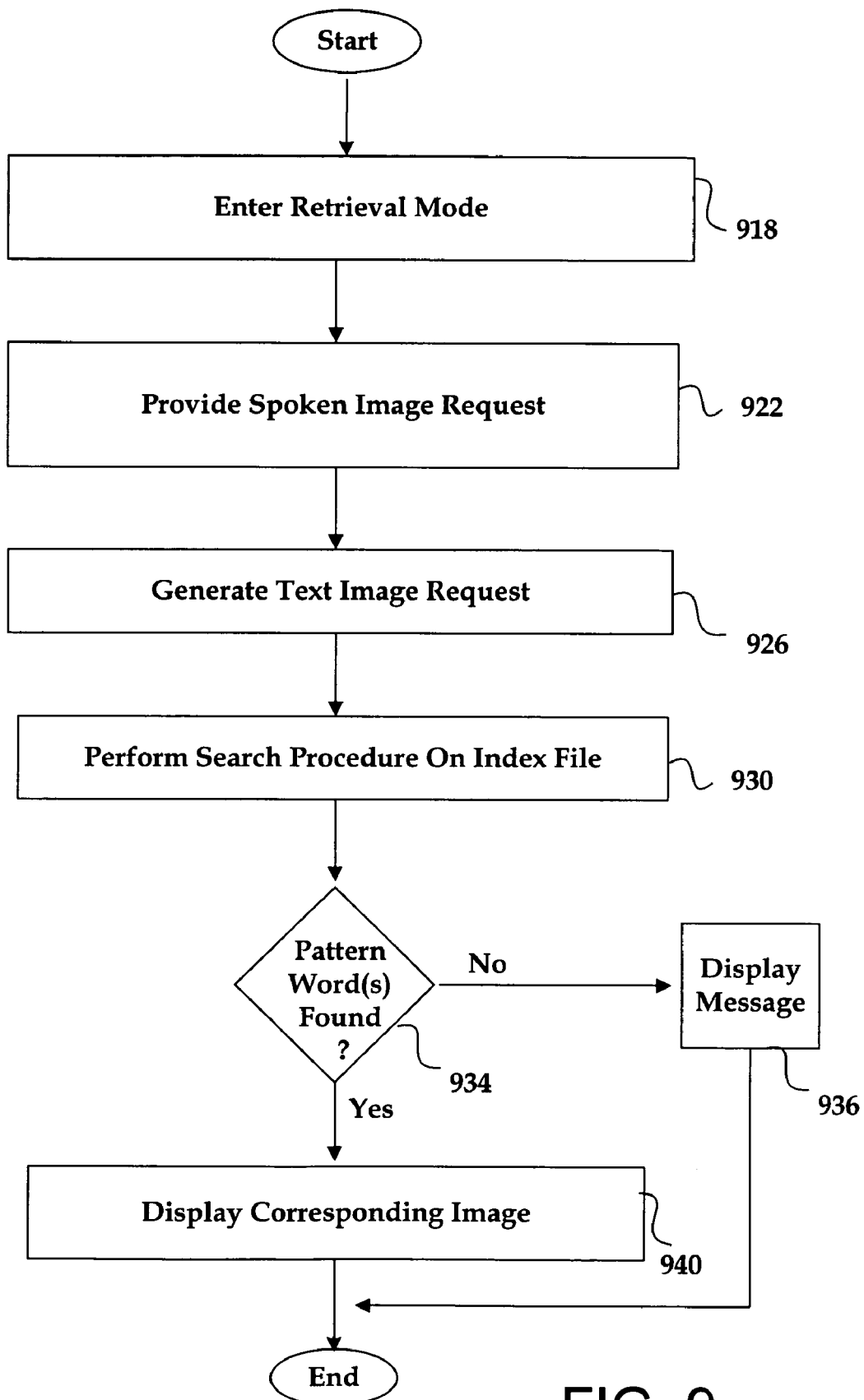
FIG. 9 is a flowchart of method steps for performing a retrieval procedure, in accordance with one embodiment of the present invention.

Referring now to FIG. 9, a flowchart of method steps for performing a retrieval procedure is shown, in accordance with one embodiment of the present invention. The FIG. 9 flowchart is presented for purposes of illustration, and in alternate embodiments, the present invention may utilize steps and sequences in addition to, or instead of, certain of the steps and sequences discussed in conjunction with the FIG. 9 embodiment.

In the FIG. 9 embodiment, in step 918, a system user or other appropriate entity initially instructs a retrieval module 518 of electronic device 110 to enter an image retrieval mode by utilizing any effective techniques. For example, the system user may use a verbal retrieval-mode command that is recognized by a speech recognition engine 214 of electronic device 110 to enter the foregoing image retrieval mode.

In step 922, the system user or other entity provides a spoken image request corresponding to a previously-captured image in stored data 226 by utilizing any appropriate techniques. For example, the system user may speak the spoken image request into sound sensor 112 (FIG. 1) of electronic device 110. In the FIG. 9 embodiment, the foregoing spoken image request may include any desired verbal description relating to a requested image from stored data 226. For example, if the system user wishes to retrieve a particular image of his dog running on a beach, the system user might provide "I want to retrieve a picture of my dog running on the beach" as the foregoing spoken image request.

In step 926, speech recognition engine 214 performs a speech recognition procedure upon the spoken image request to thereby efficiently generate a corresponding text image request. In step 930, retrieval module 518 automatically performs a search procedure upon an index file 222 that has previously been created with an authoring procedure that is the same or similar to that discussed above in conjunction with FIG. 8. Retrieval module 518 may perform the foregoing search procedure by utilizing any effective techniques. For example, in certain embodiments, retrieval module 518 examines index file 222 for one or more search matches between pattern words 612 and words or phrases from the foregoing text image request generated by speech recognition engine 214 in foregoing step 926.

In certain embodiments, retrieval module 518 may prioritize certain words or phrases from the text image request when evaluating search matches between pattern words 612 and foregoing the text image request. For example, word length characteristics may be utilized to prioritize words from the text image request that have a larger number of letters or syllables. In addition, word relationship characteristics may be used to prioritize words from the text image request that fall either at the beginning or at the ending of a corresponding image request sentence.

In step 934, retrieval module 518 determines whether one or more matching pattern word(s) 612 have been found in index file 222 during the foregoing search procedure. If no matching pattern word(s) 612 are found during the search procedure, then in step 936, retrieval module 518 may display a notification message to that effect, and the FIG. 9 process may terminate. However, in step 934, if the search procedure locates matching pattern word(s) 612 in index file 222, then in step 940, retrieval module 518 utilizes a corresponding image identifier 616 to efficiently locate and display a corresponding image from stored data 226 upon display 134 of electronic device 110. The FIG. 9 retrieval procedure may be repeated to retrieve and display any desired number of images from stored data 226 in electronic device 110. The present invention therefore provides an improved system and method for efficiently utilizing speech recognition to perform data indexing procedures.

The invention has been explained above with reference to certain preferred embodiments. Other embodiments will be apparent to those skilled in the art in light of this disclosure. For example, the present invention may be implemented using certain configurations and techniques other than those described in the embodiments above. Additionally, the present invention may effectively be used in conjunction with systems other than those described above as the preferred embodiments. Therefore, these and other variations upon the foregoing embodiments are intended to be covered by the present invention, which is limited only by the appended claims.

What is claimed is:

1. A system for indexing electronic information, comprising:
   an authoring module that coordinates an authoring procedure for creating an index file that includes pattern word sets corresponding to data objects stored in a memory device, said pattern word sets being generated with a speech recognition engine that transforms spoken data descriptions from a system user into text data descriptions, said pattern word sets being associated with data object identifiers that identify said data objects; and
   a retrieval module that manages a retrieval procedure in which said speech recognition engine converts a spoken data request into a text data request, said retrieval module comparing said text data request and said pattern word sets to identify a requested object identifier for locating a requested data object from among said data objects stored in said memory device.

2. The system of claim 1 wherein said pattern word sets each include one or more search terms derived from said text data descriptions, said search terms including one or more key words that relate to said data objects.

3. The system of claim 1 wherein an indexing graphical user interface is utilized to create said pattern word sets, said indexing graphical user interface including an object section for displaying representations of said data objects, said indexing graphical user interface also including an editing section for converting said text data descriptions into said pattern word sets.

4. The system of claim 1 wherein said data objects include stored images created by an imaging device, said stored images being saved in said memory device of a host electronic device.

5. The system of claim 4 wherein said authoring module instructs said host electronic device to enter an authoring mode for performing said authoring procedure in response to a verbal authoring-mode command that is recognized by said speech recognition engine.

6. The system of claim 4 wherein said authoring module displays thumbnail representations of said stored images on a display of said host electronic device to facilitate said authoring procedure.

7. The system of claim 4 wherein a selected image is chosen from thumbnail representations of said stored images for creating a corresponding one of said pattern word sets, said selected image being chosen by a system user after viewing said thumbnail representations on an indexing graphical user interface.

8. The system of claim 4 wherein said spoken data description is provided by a system user speaking into a sound sensor of said host electronic device, said spoken data description including a verbal description of a selected image from said stored images.

9. The system of claim 4 wherein said retrieval module instructs said host electronic device to enter a retrieval mode for performing said retrieval procedure in response to a verbal retrieval-mode command that is recognized by said speech recognition engine.

10. The system of claim 4 wherein said spoken data request is provided by a system user speaking into a sound sensor of said host electronic device, said spoken data request including a verbal request related to a selected image from said stored images.

11. The system of claim 4 wherein said retrieval module displays said requested data object on a display of said host electronic device after said retrieval procedure has been performed.

12. The system of claim 1 wherein said speech recognition engine performs speech recognition procedures upon said spoken data descriptions to produce said text data descriptions, said speech recognition engine being implemented as a large-vocabulary continuous speech recognizer that includes acoustic models, a dictionary, and a language model.

13. The system of claim 1 wherein said authoring module displays said text data descriptions on an editing section of an indexing graphical user interface for editing into said pattern word sets.

14. The system of claim 1 wherein said authoring module edits said text data descriptions on an indexing graphical user interface according to editing instructions from a system user to produce said pattern word sets, said editing instructions including a change-word instruction, a delete-word instruction, and an add-word instruction.

15. The system of claim 1 wherein said authoring module stores each of said pattern word sets along with a corresponding one of said data object identifiers into said index file for subsequently performing said retrieval procedure.

16. The system of claim 1 wherein said speech recognition engine performs speech recognition procedures upon said spoken data request to produce said text data request, said speech recognition engine being implemented as a large-vocabulary continuous speech recognizer that includes acoustic models, a dictionary, and a language model.

17. The system of claim 1 wherein said retrieval module accesses said index file for performing a search procedure that identifies said requested data object by seeking search matches between said text data request and said pattern word sets.

18. The system of claim 17 wherein said retrieval module performs said search procedure by utilizing pre-defined priority indicators or pre-defined relationship indicators.

19. The system of claim 18 wherein said pre-defined priority indicators are used to evaluate search terms from said text data request based upon corresponding word lengths.

20. The system of claim 18 wherein said pre-defined relationship indicators are utilized to evaluate search terms from said text data request depending on whether said search terms are located at the beginning or the end of said text data request.

21. A method for indexing electronic information, comprising:
performing an authoring procedure for creating an index file by utilizing an authoring module, said index file including pattern word sets corresponding to data objects stored in a memory device, said pattern word sets being generated with a speech recognition engine that transforms spoken data descriptions from a system user into text data descriptions, said pattern word sets being associated with data object identifiers that identify said data objects; and
utilizing a retrieval module to manage a retrieval procedure in which said speech recognition engine converts a spoken data request into a text data request, said retrieval module comparing said text data request and said pattern word sets to identify a requested object identifier for locating a requested data object from among said data objects stored in said memory device.

22. The method of claim 21 wherein said pattern word sets each include one or more search terms derived from said text data descriptions, said search terms including one or more key words that relate to said data objects.

23. The method of claim 21 wherein an indexing graphical user interface is utilized to create said pattern word sets, said indexing graphical user interface including an object section for displaying representations of said data objects, said indexing graphical user interface also including an editing section for converting said text data descriptions into said pattern word sets.

24. The method of claim 21 wherein said data objects include stored images created by an imaging device, said stored images being saved in said memory device of a host electronic device.

25. The method of claim 24 wherein said authoring module instructs said host electronic device to enter an authoring mode for performing said authoring procedure in response to a verbal authoring-mode command that is recognized by said speech recognition engine.

26. The method of claim 24 wherein said authoring module displays thumbnail representations of said stored images on a display of said host electronic device to facilitate said authoring procedure.

27. The method of claim 24 wherein a selected image is chosen from thumbnail representations of said stored images for creating a corresponding one of said pattern word sets, said selected image being chosen by a system user after viewing said thumbnail representations on an indexing graphical user interface.

28. The method of claim 24 wherein said spoken data description is provided by a system user speaking into a sound sensor of said host electronic device, said spoken data description including a verbal description of a selected image from said stored images.

29. The method of claim 24 wherein said retrieval module instructs said host electronic device to enter a retrieval mode for performing said retrieval procedure in response to a verbal retrieval-mode command that is recognized by said speech recognition engine.

30. The method of claim 24 wherein said spoken data request is provided by a system user speaking into a sound sensor of said host electronic device, said spoken data request including a verbal request related to a selected image from said stored images.

31. The method of claim 24 wherein said retrieval module displays said requested data object on a display of said host electronic device after said retrieval procedure has been performed.

32. The method of claim 21 wherein said speech recognition engine performs speech recognition procedures upon said spoken data descriptions to produce said text data descriptions, said speech recognition engine being implemented as a large-vocabulary continuous speech recognizer that includes acoustic models, a dictionary, and a language model.

33. The method of claim 21 wherein said authoring module displays said text data descriptions on an editing section of an indexing graphical user interface for editing into said pattern word sets.

34. The method of claim 21 wherein said authoring module edits said text data descriptions on an indexing graphical user interface according to editing instructions from a system user to produce said pattern word sets, said editing instructions including a change-word instruction, a delete-word instruction, and an add-word instruction.

35. The method of claim 21 wherein said authoring module stores each of said pattern word sets along with a corresponding one of said data object identifiers into said index file for subsequently performing said retrieval procedure.

36. The method of claim 21 wherein said speech recognition engine performs speech recognition procedures upon said spoken data request to produce said text data request, said speech recognition engine being implemented as a large-vocabulary continuous speech recognizer that includes acoustic models, a dictionary, and a language model.

37. The method of claim 21 wherein said retrieval module accesses said index file for performing a search procedure that identifies said requested data object by seeking search matches between said text data request and said pattern word sets.

38. The method of claim 37 wherein said retrieval module performs said search procedure by utilizing pre-defined priority indicators and pre-defined relationship indicators.

39. The method of claim 38 wherein said pre-defined priority indicators are used to evaluate search terms from said text data request based upon corresponding word lengths.

40. The method of claim 38 wherein said pre-defined relationship indicators are utilized to evaluate search terms from said text data request depending on whether said search terms are located at the beginning or the end of said text data request.

41. The method of claim 37 wherein said retrieval module performs said search procedure by utilizing pre-defined priority indicators to evaluate search terms from said text data request.

42. The method of claim 37 wherein said retrieval module performs said search procedure by utilizing pre-defined relationship indicators to evaluate search terms from said text data request.

43. A computer-readable medium comprising program instructions for indexing electronic information by:

performing an authoring procedure for creating an index file by utilizing an authoring module, said index file including pattern word sets corresponding to data objects stored in a memory device, said pattern word sets being generated with a speech recognition engine that transforms spoken data descriptions from a system user into text data descriptions for creating said pattern word sets, said pattern word sets being associated with data object identifiers that identify said data objects; and utilizing a retrieval module to manage a retrieval procedure in which said speech recognition engine converts a spoken data request into a text data request, said retrieval module comparing said text data request and said pattern word sets to identify a requested object identifier for locating a requested data object from among said data objects stored in said memory device.

44. A system for cataloguing electronic information, comprising:

means for performing an authoring procedure for creating an index file that includes pattern word sets corresponding to data objects stored in a memory device, said pattern word sets being generated with a speech recognition engine that transforms spoken data descriptions from a system user into text data descriptions for creating said pattern word sets, said pattern word sets being associated with data object identifiers that identify said data objects; and means for managing a retrieval procedure in which said speech recognition engine converts a spoken data request into a text data request, said means for managing then comparing said text data request and said pattern word sets to identify a requested object identifier for locating a requested data object from among said data objects stored in said memory device.

* * * * *